Sept. 26, 1967 G. W. MERRITT 3,343,502
CONVERTIBLE RAILWAY VEHICLE HIGHWAY TRAILER
Filed Jan. 29, 1964 5 Sheets-Sheet 1
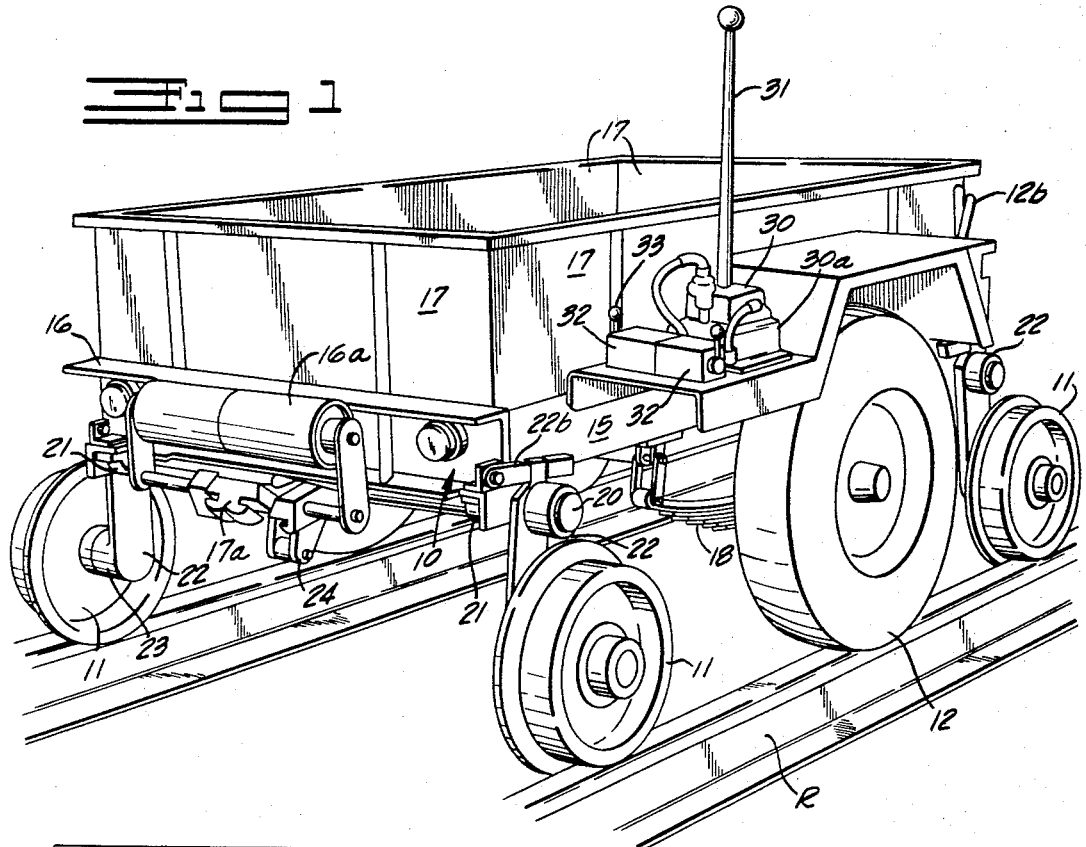
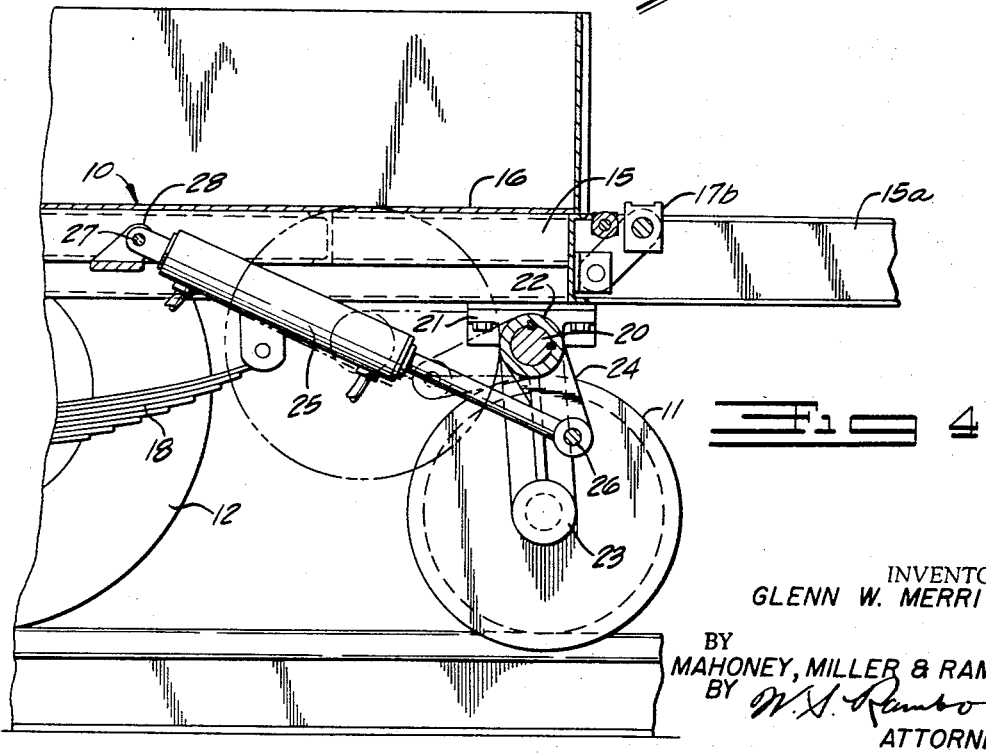
INVENTOR.
GLENN W. MERRITT
BY
MAHONEY, MILLER & RAMBO
BY
ATTORNEYS

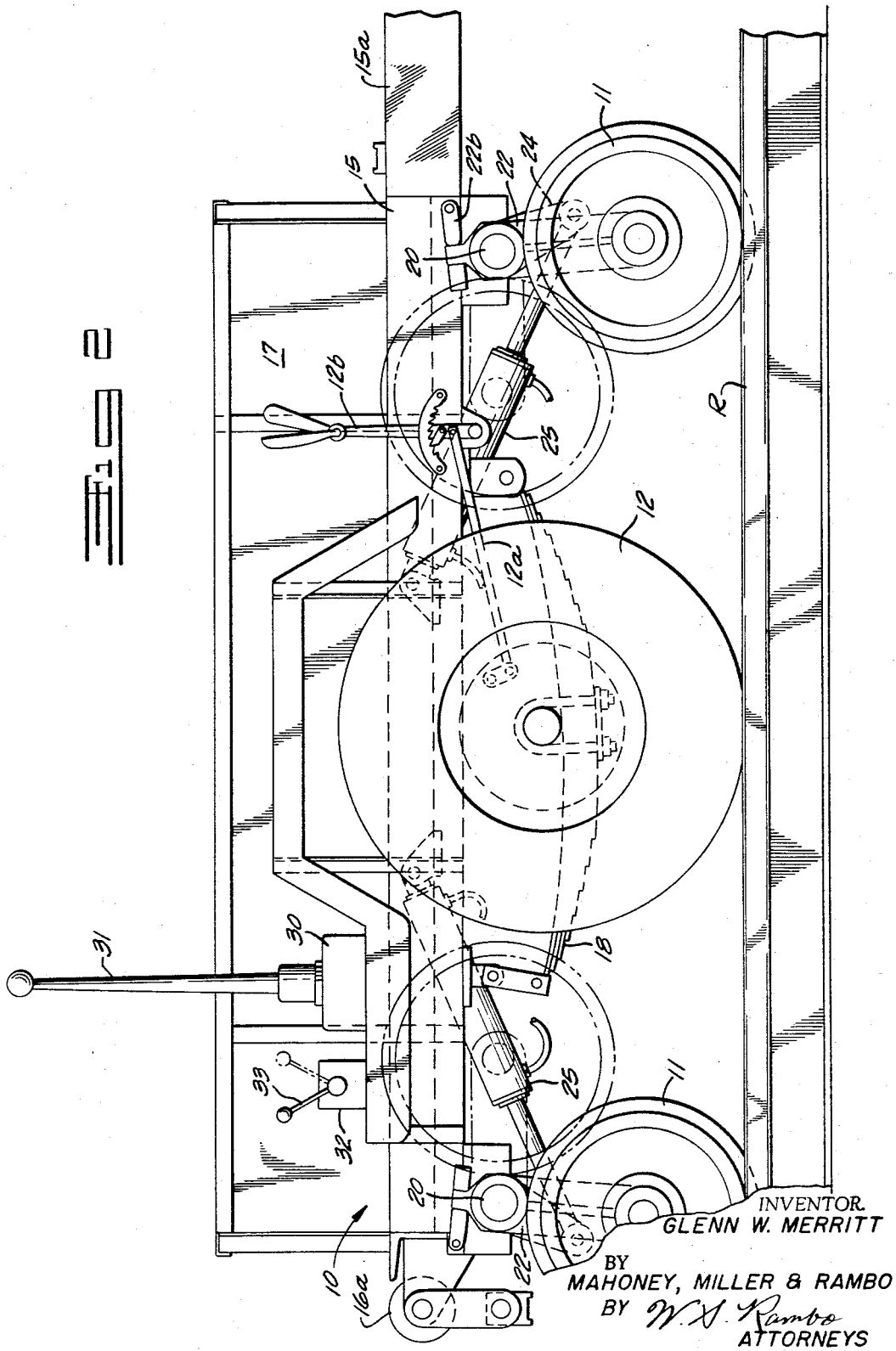

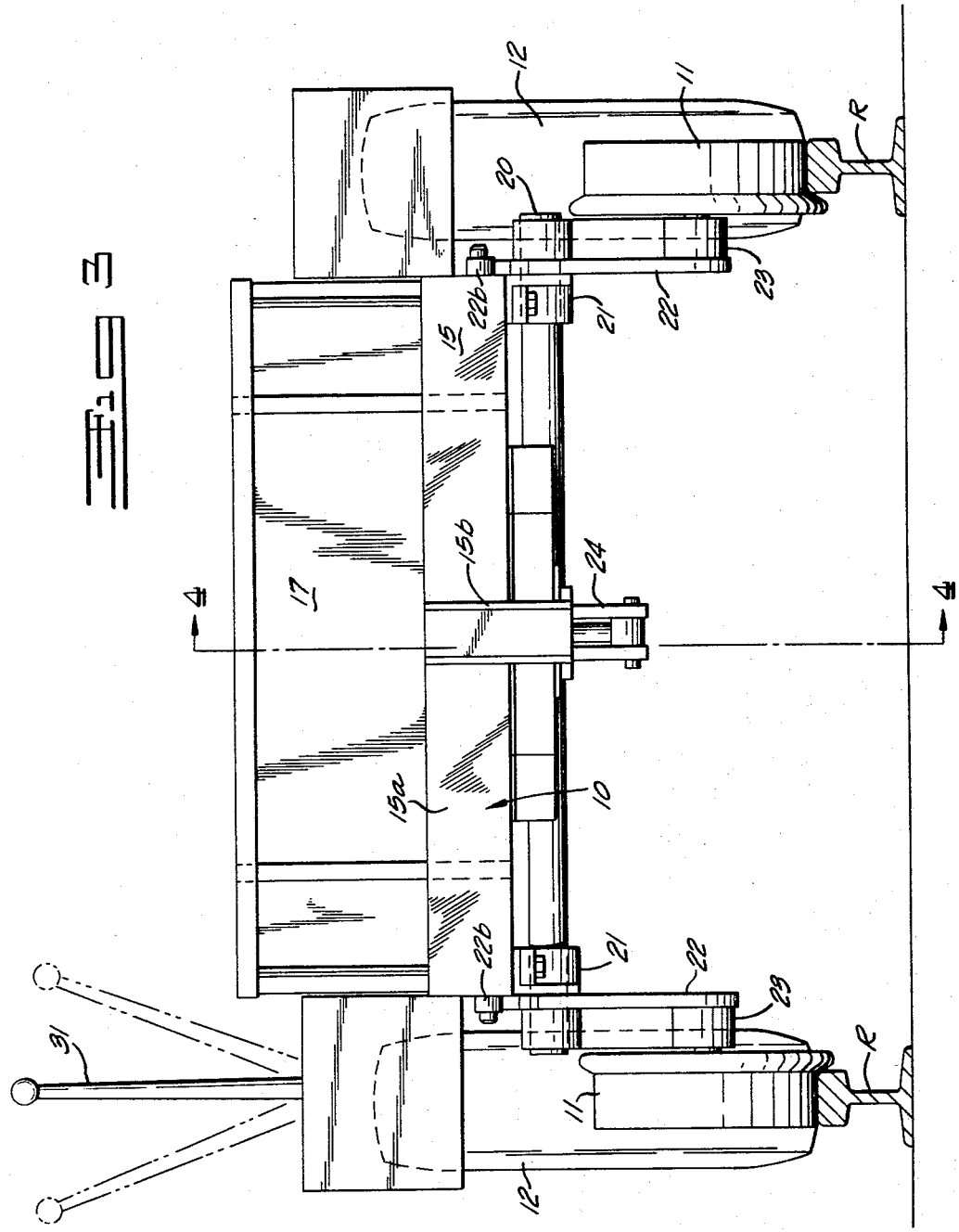

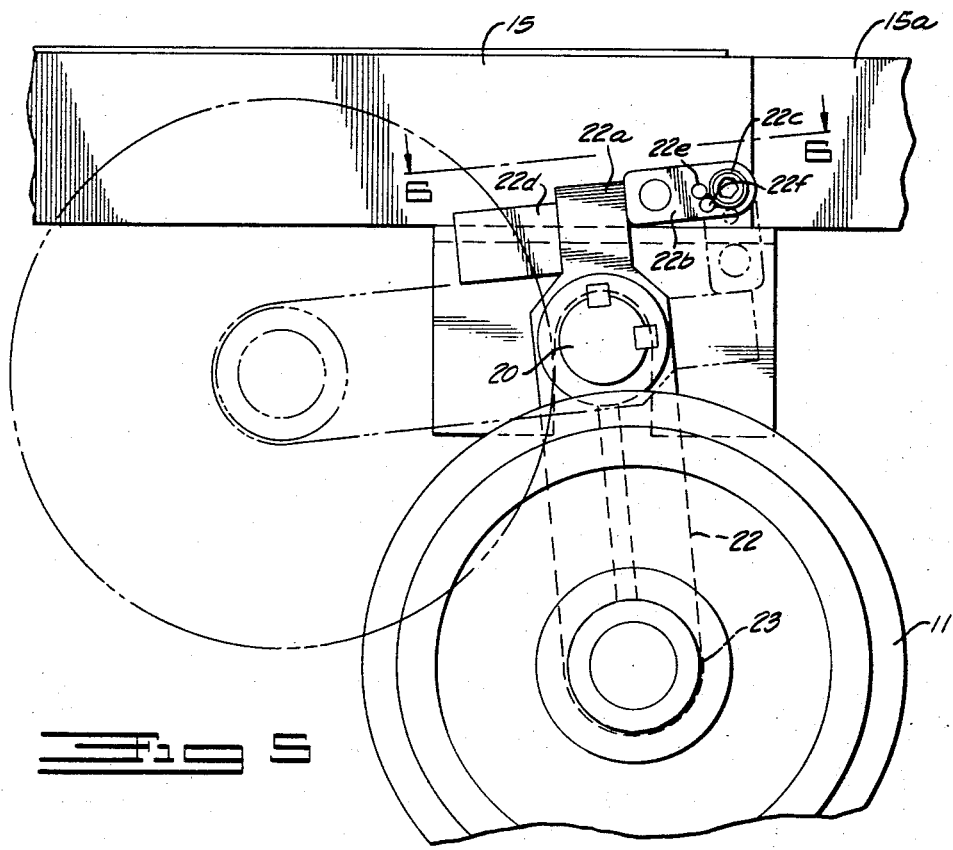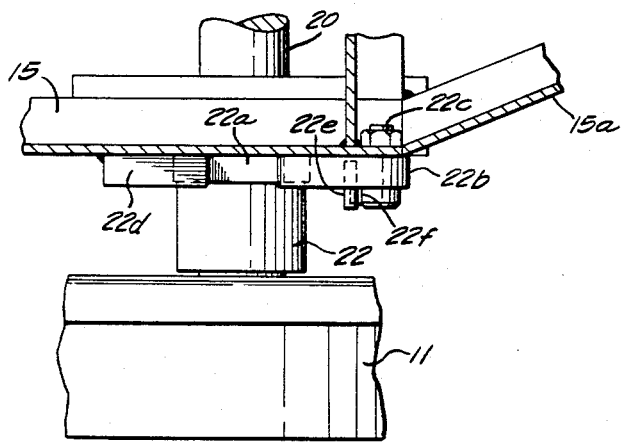

Sept. 26, 1967  G. W. MERRITT  3,343,502
CONVERTIBLE RAILWAY VEHICLE HIGHWAY TRAILER
Filed Jan. 29, 1964  5 Sheets-Sheet 5
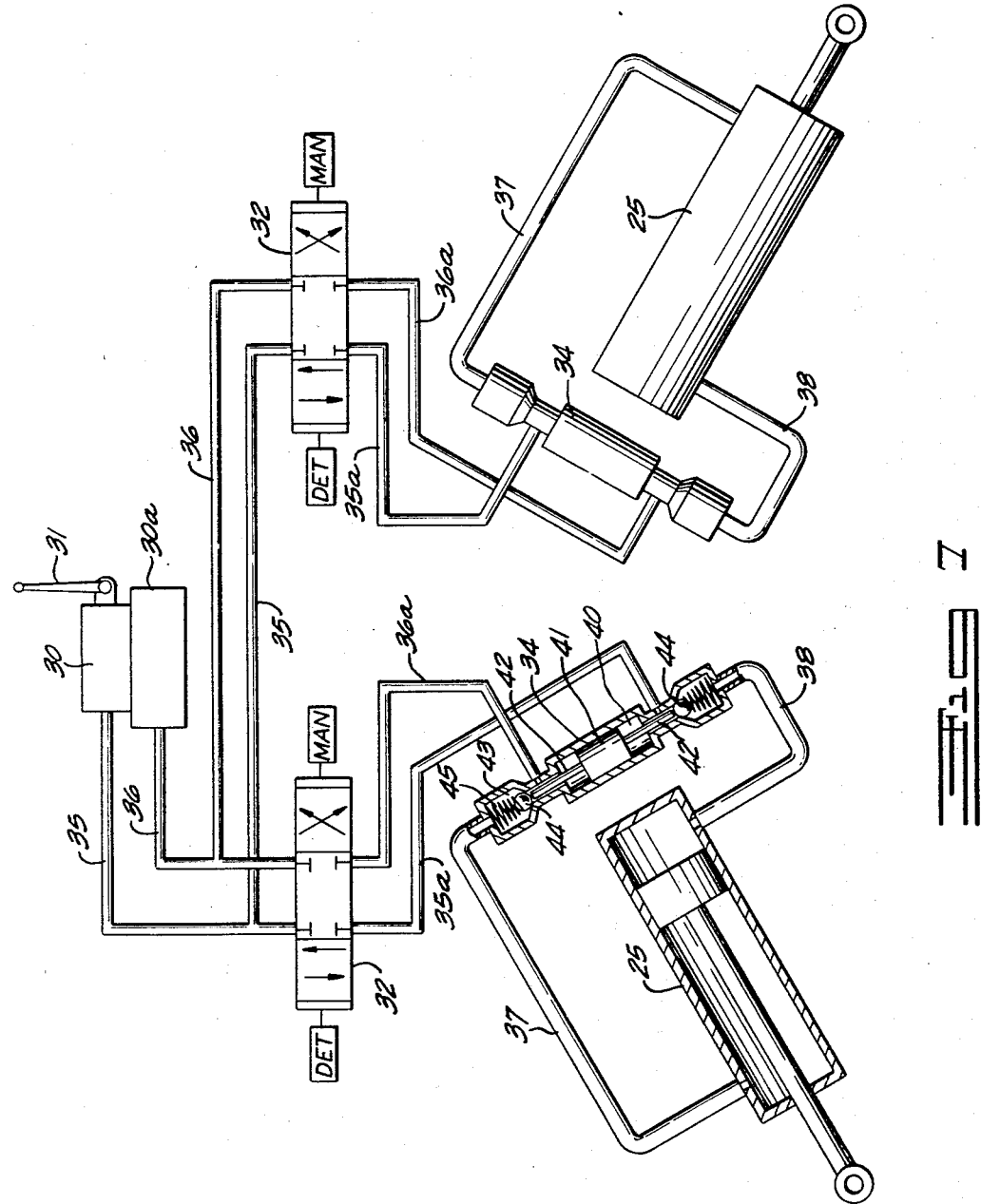
INVENTOR.
GLENN W. MERRITT
BY
MAHONEY, MILLER & RAMBO
BY
ATTORNEYS

United States Patent Office 3,343,502
Patented Sept. 26, 1967

3,343,502
CONVERTIBLE RAILWAY VEHICLE HIGHWAY TRAILER
Glenn W. Merritt, Bowerston, Ohio, assignor to The Nolan Company, Bowerston, Ohio, a corporation of Ohio
Filed Jan. 29, 1964, Ser. No. 341,081
10 Claims. (Cl. 105—215)

This invention relates to a combination track and highway vehicle. It has to do, more specifically, with a vehicle which is readily adaptable by quick and easy adjustments either for operation on railroad tracks or on highways.

The vehicle of this invention is particularly useful for maintenance work along railroad tracks and when operating on the tracks can serve as a push-car for carrying rails, ties, tie plates, frogs, guard rails, pre-fab timber crossings, rail-laying equipment, and all kinds of maintenance tools. It, however, can be hooked to motorized rail equipment to be moved along on the rails therewith. By a simple adjustment, however, which can be quickly made with little effort, the vehicle may be removed from the rails and be converted into a trailer for operation on a highway so that it can be towed by motor-truck on highways to a highway crossing near a different section of the railroad where work is to be done. At that point, by simple, easy adjustment, it can be again converted into a car for operation on the rails and be positioned on said rails.

The preferred embodiment of this invention is illustrated in the accompanying drawings in which:

FIGURE 1 is a perspective view of a vehicle embodying my invention showing it supported by a railroad track.

FIGURE 2 is a side elevational view of the vehicle shown in FIGURE 1.

FIGURE 3 is a front elevational view of the vehicle shown in FIGURE 1.

FIGURE 4 is a fragmentary, vertical longitudinal sectional view taken substantially along line 4—4 of FIGURE 3.

FIGURE 5 is an enlarged detail in side elevation illustrating wheel stop and lock arrangement provided in cooperation with each pair of the rail-engaging wheels.

FIGURE 6 is a horizontal sectional view taken along line 6—6 of FIGURE 5.

FIGURE 7 is a schematic view illustrating the hydraulic system used in adjusting the two pairs of rail-engaging wheels.

With reference to the drawings, the vehicle is illustrated as comprising mainly a chassis 10 which is provided with flanged wheels 11 at the four corners thereof for operating on rails, and a pair of intermediate wheels 12, preferably of the pneumatic-tired type, for operating on a highway. The axles of the wheels 12 are relatively fixed on the frame whereas those for the wheels 11 are connected to the frame for relative vertical swinging movement. With this arrangement, when the flanged wheels 11 are raised, the pair of highway wheels 12 can engage a highway or other surface for supporting the vehicle and when they are lowered, such flanged wheels may engage rails although the intermediate wheels 12 will also engage the rails.

The chassis 10 may comprise the frame 15 suitably fabricated, for example, from the channel beams and carrying a body which includes the deck 16 and upright side and end walls 17 which are preferably removable. The forward end of the frame 15 is extended at 15a to provide a tongue by means of which the vehicle may be towed, a suitable hitch 15b (FIGURE 3) being provided at the forward end for hitching to a towing vehicle.

Rollers 16a may be provided at the rear of the body to facilitate loading of the rails when the ends 17 are removed. Also at the rear, rail clamps 17a which are swingable up into association with the deck 16 may be provided and at the front, similar clamps 17b may be provided but the details of these clamps and rollers are not important to the present invention.

The wheels 12, as previously indicated, have their axles carried in the usual manner on the frame 15 by leaf springs 18 (FIGURE 2) which are suitably attached to the frame. The axles of these wheels are located approximately midway of the length of the main part of the frame. The usual brake units are associated with the respective wheels 12 and are actuated simultaneously by linkage 12a which is controlled by a handle 12b.

The flanged wheels 11 are arranged in front and rear pairs, the two wheels of each being independently vertically adjustable. Each pair is mounted for adjustment in an identical manner. Thus, each pair of wheels 11 (FIGURES 3, 5 and 6) is suspended from a rocker shaft 20 which extends transversely below the frame 15 at the corresponding end thereof. Each shaft is rotatably mounted in the axially aligned shaft bearings 21 at the opposite sides of the frame 15. At each outer end of each shaft a crank arm 22 is keyed to the shaft and this crank arm has on its outer end a bearing housing 23 for receiving the axle of the associated flanged wheel 11. Thus, the wheel is rotatably mounted on the outer end of the rocker or crank arm 22. The inner end of a rocker arm 22 of each pair is provided with a locking lug extension 22a which cooperates with an adjacent manually operated latch bar 22b that is pivoted to the frame 15, as at 22c. When the rocker arms 22 occupy their downwardly extended positions, as indicated by full lines in FIGURE 5, the lug extension 22a abuts against a stationary stop block 22d which is rigidly secured to the frame 15, and the lug extension may be locked in this position by swinging the latch bar 22b in a counterclockwise direction to the full line position indicated in FIGURE 5. In this latter position, a stop pin 22e carried by the latch bar 22b engages a stop pin 22f which is rigidly secured to the frame 15. When it is desired to retract the wheels 11 and their supporting arms 22, the latch bar 22b is manually flipped over in a clockwise direction, as shown in broken lines in FIGURE 5, to permit the lug extension 22a to swing in a clockwise direction. As the lug extension 22a swings in a clockwise direction, it first strikes the depending bar 22b to swing the same rightwardly until the lug extension clears the bar 22b, at which time the bar 22b will swing by gravity behind the lug extension 22a to lock the arms 22 in their retracted positions.

Each shaft 20 can be rocked independently to swing the pair of arms 22 which it carries vertically and thereby to adjust simultaneously the vertical positions of the pair of opposed wheels 11 by means of a rocker arm in the form of a yoke 24 (FIGURES 1 to 4) disposed on the shaft 20 midway of the length thereof. This yoke is connected to an actuating hydraulic cylinder and piston or ram unit 25, the piston rod thereof being shown pivoted within and to the outer end of the yoke as indicated at 26. The opposite or cylinder end of the ram as shown is pivoted at 27, for vertical swinging movement, to a lug 28 carried by the frame 15. It will be apparent that actuating the two rams 25 simultaneously will rock both shafts 20 simultaneously or actuating each ram separately will rock only the selected shaft. Retracting the rams will swing the arms 22 vertically upwardly to lift the wheels 11 whereas extending the rams will swing them downwardly to lower the wheels.

The two rams may be actuated independently or simultaneously by a hydraulic system of the type indicated schematically in FIGURE 7. The hydraulic system in which the two double-acting rams 25 are connected includes a hand pump 30 having a hydraulic reservoir 30a in its base. The pump may be actuated by the operator on the vehicle by means of a handle 31. As previously indicated, the rams 25 may be actuated independently or simultaneously by the pump 30 and for this reason, the four-way reversing control valves 32 are connected respectively between the cylinders of the two rams 25 and the pump 30. The valves 32 are mounted adjacent the pump 30 so that the control handles 33 thereof are readily accessible to the operator and each valve may be manually set independently in any of three positions which are: neutral, ram-retracting position, and extending position. Each cylinder is equipped with a pilot operated check valve 34. It will be noted that a line 35 connected to this valve leads from the pressure side of the pump 30, which has its suction side connected to the reservoir 30a, and that a line 36 connected to this valve leads to the reservoir 30a. Lines 35a and 36a also connect between the valve 32 and the valve 34. One of the ends of the valve 34 is connected by a line 37 to one end of the cylinder of the associated ram 25 and the other end of the valve 34 is connected by a line 38 to the opposite end of such cylinder.

The valve 34 is provided with an intermediate cylindrical chamber 40 in which a piston 41 is disposed and this piston has the pins 42 projecting from its opposite ends. The ends of the valve 34 have the check valve chambers 43 in which ball check valves 44 are disposed for movement, each ball normally being biased inwardly onto its seat by means of a spring 45. Each of the lines 35a and 36a is connected to the valve 34 between the adjacent end of the cylindrical chamber 40 and the associated check valve chamber 43.

Assuming the flanged wheels 11 are in their lowered positions and are operating on the rails R, as indicated in the drawings, it will be noted that the rams 25 are extended and the crank arms 22 are swung downwardly, the arms being locked in this position by the upwardly positioned latch bars 22b as shown in full lines in FIGURE 5. At this time, the rail-engaging wheels 11 will engage the rails R but the wheels 12 will also engage the rails since the wheels 11 and 12 are in substantially the same vertical planes longitudinally of the vehicle and the wheels 12 are at such a level that when the vehicle is unloaded, the wheels 12 engage the rails and substantially support the weight of the vehicle, the wheels 11 merely engaging the rails. Further loading of the vehicle will compress the tires on the wheels 12 so that the load will then be carried fully by the wheels 11 on the rails. Since the wheels 12 are always in contact with the rails R, with the vehicle loaded or unloaded, the brake units associated therewith will always be effective on the vehicle.

When it is desired to remove the vehicle from the rails R, it is merely necessary to push or otherwise move the vehicle to a highway crossing and raise the wheels 11 to permit support of the chassis by the wheels 12. At this time, the wheels may be manually locked in their upper positions by the latch bars 22b, as indicated in broken lines in FIGURE 5. The vehicle can, before or after this adjustment, be hitched to a truck or other towing vehicle for operation on the highway. Also, if it is desirable to merely move the vehicle or car off the rails, the wheels 11 can be raised so as to support it on the wheels 12 and since only a single pair of intermediate wheels 12 are used, it can then be readily pivoted on the wheels 12 to swing it around for lateral movement off the rails.

As previously indicated, the rams 25 may be operated independently or simultaneously to independently or simultaneously adjust the respective pairs of wheels 11 by moving the handle 31. With both the valves 32 in the closed positions indicated in FIGURE 7, neither of the adjusting shafts 20 will be rotated. To rotate both shafts 20 and, consequently, adjust both pairs of wheels 11, both valves will be open. To rotate a selected shaft 20, the associated valve 32 only is opened. Both valves will operate identically so a description of one will suffice. Assuming that the valve 32 to the left of FIGURE 7 is moved to a position to extend the ram 25 which it controls upon actuation of the pump 30 by the handle 31, the pressure line 35 will be connected to the line 35a through the valve 32 and the latter line will be connected to the inner end of the ram cylinder through the valve 34 and the line 38. This will unseat the ball check valve 44 at the outer end of the line 38 and allow fluid to reach the inner end of the ram cylinder pushing the piston thereof outwardly. At the same time, the fluid from the line 35a will act to move the valve piston 41 so that the opposite pin 42 will engage and unseat the opposite ball 44 which is at the outer end of the line 37. This will allow fluid to exhaust from the outer end of the ram cylinder through the line 37, past the ball 44 into the line 35a, through the valve 32, into the line 36, and into the reservoir 30a. Thus, the ram will be extended and move the associated pair of wheels 11 downwardly. With the valve 32 set in a reversing position, actuation of the pump 30 by the handle 31 will retract the ram. Fluid will pass from the line 35, into the line 36a, into the valve 34 where it will unseat the check valve 44 at the outer end of the line 37 and will flow through that line into the outer end of the ram cylinder. At the same time, fluid will exhaust from the inner end of the ram cylinder, out through the line 38, past the associated ball check valve 44 which has been unseated by the associated pin 42, out through the line 35a and through the valve 32 into the line 36 and finally into the reservoir 30a. Thus, the ram 25 is retracted to swing the associated pair of wheels 11 upwardly.

The provision of the check valves 34 in association with the cylinders of the rams makes it possible to raise the pair of wheels 11 at one end of the cart without having collapse of the wheel supports at the other end. If the check valves were not provided, it would be possible for the off-center load to retract the ram at the supporting end, without actuation of the hand pump, and to cause sudden collapse of the wheel supports at that end immediately upon movement of the control valve 32 to retracted position. With this arrangement, it will still be necessary to pump the handle 31 to retract the wheels 11 at that end even if an off-center load is acting thereon due to the wheels 11 at the other end having been raised.

Thus, the wheels 11 can be actuated in independent pairs or simultaneously in their movement between operative and inoperative positions.

It will be apparent that the above described invention provides a simple arrangement which can be actuated easily by one operator for adapting the vehicle either for operation on rails or as a trailer on a highway. When used on the rails, it may be operated independently as a pushcar or may be towed behind motorized equipment on the rails.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. A combined track and highway vehicle comprising a chassis frame, flanged wheels arranged in leading and trailing pairs of two opposed wheels for supporting the frame on rails, highway engaging wheels arranged in a single pair of two opposed wheels between the pairs of flanged wheels for supporting the vehicle on a highway and to facilitate manipulation of the vehicle when the flanged wheels are not in engagement with the rails, means for adjusting the flanged wheels and the highway wheels in pairs relatively, said means comprising crank arms connected to the frame for vertical swinging movement, and hydraulic rams connected between the crank arms and the frame for swinging said crank arms vertically.

2. The combination of claim 1 in which pairs of said crank arms are carried by shafts rotatably mounted on said chassis frame to adjust the flange wheels between a lower rail engaging position and an upper non-engaging position, said hydraulic rams being connected to the respective shafts for rotation thereof, and mechanical latching means carried by the chassis frame for locking said shaft in predetermined rotated positions.

3. The combination of claim 2 in which the highway wheels are pneumatically-tired wheels which engage the rails even when the flanged wheels are in engagement therewith, and brake means cooperating with said highway wheels.

4. A combined track and highway vehicle comprising a chassis frame, flanged wheels arranged on the leading and trailing ends of the frame in pairs of two opposed wheels for supporting the frame on rails, highway engaging wheels arranged in a single pair of two opposed wheels longitudinally intermediate the pairs of leading and trailing flanged wheels, means for adjusting the flanged wheels independently in pairs on the frame relative to the other wheels, said means comprising crank arms supporting the respective flanged wheels at their outer ends for rotation, transverse rock shafts carried by said frame for rotation and having the inner ends of respective pairs of crank arms keyed thereto, means for rocking said shafts simultaneously, said means comprising a rock arm connected to each shaft intermediate its ends, a hydraulic ram connected to each rock arm and the frame, and means for controlling the rams.

5. The combination of claim 4 including pivoted latch bars carried by the frame for engaging crank arms fixed on each shaft to lock the shaft in predetermined positions.

6. The combination of claim 5 in which each of the latch bars is pivotally mounted on the frame so that it hangs in dependent position adjacent the cooperating crank arm and is engaged thereby to permit passage of the crank as it swings in one direction and then engagement with the crank to prevent reverse swinging of the crank.

7. The combination of claim 4 in which said controlling means comprises a hydraulic system which includes a manual hydraulic pump and a pair of said rams of the double-acting type, and an independently controlled reversing valve for each of said rams connected in said system between its respective ram and said pump and adjustable to ram-extending or ram-retracting positions which result upon actuation of said manual pump.

8. The combination of claim 7 in which each of said rams is provided with a check valve connected in said system between it and its respective reversing valve to prevent a load on the chassis frame from actuating the ram without actuating said pump upon setting the reversing valve in ram-retracting position.

9. The combination of claim 8 in which said check valve comprises a housing having opposite ends connected respectively by the lines of a pair to opposite ends of the ram, each of said valve housing ends having a valve seat with a ball seated inwardly thereon by pressure in said lines, said valve having a piston chamber intermediate its ends, a piston in said chamber having oppositely extending pins for alternately engaging said balls to outwardly unseat them, said chamber on opposite sides of said piston being connected respectively to the lines of a pair leading to said reversing valve.

10. An attachment for adapting a highway vehicle for travel on rails of a railway track; said attachment comprising means adapted to be attached to the under side of a highway vehicle adjacent the front and rear ends of the vehicle, upwardly retractable rail engaging wheel units on said means adjacent each end of the vehicle, which units, in downwardly extending position, support at least part of the weight of the vehicle on the rails of the railway track and which, in upwardly retracted position, permit the vehicle to run along the highway on its own wheels, said units each including a pair of arms having pivotal connections respectively at each end of the vehicle for swinging about a horizontal pivotal axis spaced above the running surface and extending transverse of the vehicle, axle means having flanged rail-engaging wheels thereon, means mounting said axle means on the free ends of said arms, said free ends, during movement of said units from said upwardly retracted position to said downwardly extending position, swinging along an arc which passes downwardly and thence upwardly beyond a center disposed directly below the pivotal axis of the arms, stop means engaging said arms in the downwardly extended beyond-center position for limiting the upward swinging thereof and maintaining the flanged wheels against the rails, the pivotal connections between each pair of arms at the respective end portions of said vehicle each comprising a transverse operating rod on the pivotal axis of the arms journaled in said means attachable to the underside of the vehicle, said arms being non-rotatably connected to said operating rod, and actuating means on said operating rod to rotate said operating rod, whereby said operating rod may be rotated to swing the arms of said wheel units from retracted to extended position or vice versa.

References Cited

UNITED STATES PATENTS 2,655,873 10/1953 McDonald _____ 105—215
2,986,102 5/1961 Cox _____ 105—177 X
3,019,742 2/1962 Kershaw _____ 105—177 X ARTHUR L. LA POINT, *Primary Examiner.*

H. BELTRAN, *Assistant Examiner.*